United States Patent [19]
Cahill

[11] Patent Number: 5,284,705
[45] Date of Patent: Feb. 8, 1994

[54] ANTISTATIC COATING COMPRISING TIN-OXIDE-RICH PIGMENTS AND PROCESS AND COATED SUBSTRATE

[75] Inventor: Jonathan W. Cahill, Solon, Ohio

[73] Assignee: Garland Floor Co., Cleveland, Ohio

[21] Appl. No.: 578,898

[22] Filed: Sep. 6, 1990

[51] Int. Cl.⁵ .............................................. B32B 5/16
[52] U.S. Cl. .................................. 428/328; 252/518; 428/329; 428/423.7; 428/425.9; 428/913
[58] Field of Search ............ 428/206, 207, 208, 328, 428/403, 404, 407, 327, 423.7, 425.9, 913, 329; 252/518

[56] References Cited

U.S. PATENT DOCUMENTS

| | | | |
|---|---|---|---|
| 4,052,209 | 10/1977 | Huffman et al. | 252/500 |
| 4,229,554 | 10/1980 | Newkirk et al. | 525/438 |
| 4,243,503 | 1/1981 | Lieb et al. | 204/290 F |
| 4,246,143 | 1/1981 | Sonoda et al. | 252/518 |
| 4,303,554 | 12/1981 | Sudo et al. | 252/518 |
| 4,373,013 | 2/1983 | Yoshizumi | 428/570 |
| 4,416,963 | 11/1983 | Takimoto et al. | 430/69 |
| 4,431,764 | 2/1984 | Yoshizumi | 524/409 |
| 4,452,830 | 6/1984 | Yoshizumi | 428/403 |
| 4,511,218 | 4/1985 | Fritz | 350/356 |
| 4,514,322 | 4/1985 | Swoboda | 252/518 |
| 4,561,963 | 12/1985 | Owen et al. | 204/433 |
| 4,568,609 | 2/1986 | Sato et al. | 428/403 |
| 4,571,361 | 2/1986 | Kawaguchi et al. | 428/329 |
| 4,594,182 | 6/1986 | Hashimoto et al. | 252/518 |
| 4,650,819 | 3/1987 | Nakamoto et al. | 523/223 |
| 4,655,966 | 4/1987 | Guillaumon et al. | 252/518 |
| 4,670,188 | 6/1987 | Iwasa et al. | 252/513 |
| 4,734,319 | 3/1988 | Doi et al. | 428/328 |
| 4,880,703 | 11/1989 | Sakamoto et al. | 428/378 |
| 4,904,636 | 2/1990 | Hayashi et al. | 503/207 |
| 4,911,864 | 3/1990 | Sato et al. | 252/518 |
| 4,981,729 | 1/1991 | Zaleski | 428/500 |
| 4,981,891 | 1/1991 | Felter et al. | 524/247 |
| 5,051,209 | 9/1991 | Mirabeau et al. | 252/518 |

*Primary Examiner*—Paul J. Thibodeau
*Assistant Examiner*—H. Thi Lê
*Attorney, Agent, or Firm*—Watts Hoffmann Fisher & Heinke

[57] ABSTRACT

An improved binder-continuous, curable composition is disclosed. It comprises a pigment portion dispersed in a curable film-forming fluent portion, the pigment portion containing a tin oxide-rich electrically-conductive pigment in a pigment blend comprising an electrical conductivity-enhancing proportion of hard impalpable, achromatic filler mineral. Also disclosed are: an improvement in process for involving the plural coating a surface of a substrate, the topcoating being antistatic and containing an opacifying pigment mixture comprising an electrically-conductive tin oxide-rich pigment; and the resulting coated article. The process comprises applying at least one undercoat to said surface, the uppermost undercoat exhibiting objectionable coloration and having electrical resistance when alone and cured that is at least as low as that of said antistatic topcoating when alone and cured, applying said opacifying antistatic coating as the topcoat, and curing the said uppermost undercoat and said topcoating.

36 Claims, 1 Drawing Sheet

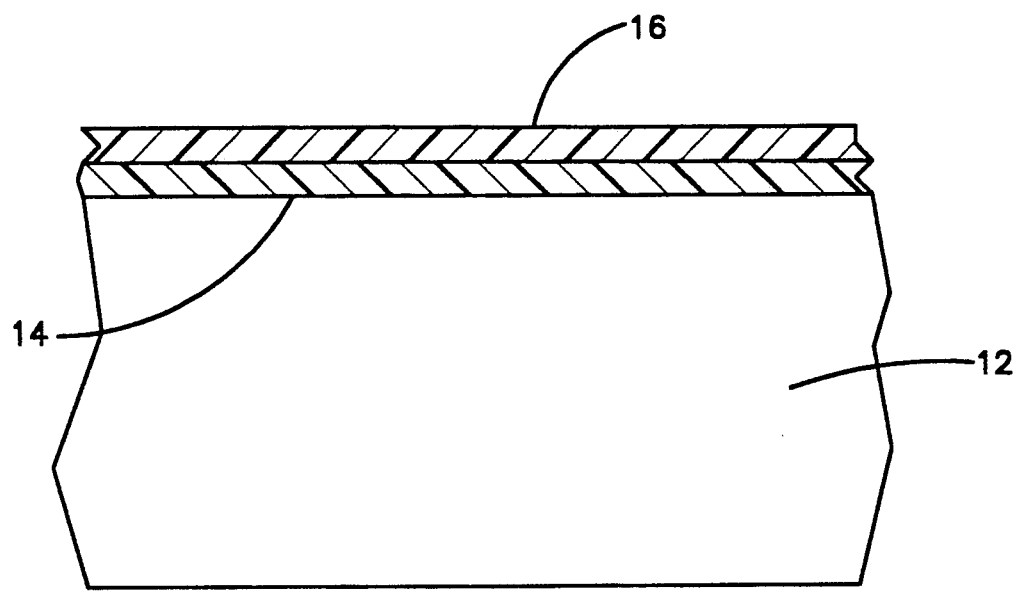

ANTISTATIC COATING COMPRISING TIN-OXIDE-RICH PIGMENTS AND PROCESS AND COATED SUBSTRATE

This invention relates to an antistatic coating composition for imparting electrostatic dissipative control to a variety of substrates, to a coating process for imparting such antistatic properties to the surface of a substrate coated therewith, and to the resulting coated surface. Each of these aspects features pigmentation comprising tin oxide-rich electrically-conductive pigment and a curable organic film-forming binder.

BACKGROUND OF THE INVENTION

Pigment producers offer tin oxide-rich conductive pigments that are very light in color, usually slightly tawny, grayish or off-white colorations for a variety of antistatic uses. Light-colored pigments are desirable for formulating light-colored coatings.

Frequently the tin oxide is doped with a minor proportion of an antimony oxide, indium oxide, phosphoric anhydride, tellurium oxide, germanium oxide, lanthanum oxide, and/or titanium dioxide. U.S. Pat. No. 4,655,966 to Guillaumon et al. shows such white to off-white doped pigments and their incorporation into binders such as solvent-thinned epoxy resins, etc. to make paints.

Composite, desirably light-colored, tin oxide-rich conductive pigments also have taken the form of tin oxide ($SnO_2$) deposited substantially uniformly on mica flake (e.g. "Meta-Mica", a trademark of Sanyo Color Works, Ltd., Japan), submicron spherical mixed metal oxide powders, e.g. ("Stanostat" powders, Stanostat being the trademark of Keeling & Walker, Ltd., of the U.K.), and antimony oxide-d oxide-coated titanium dioxide pigments such as that of U.S. Pat. No. 4,373,013.

One important use of antistatic coatings of the sort referred to is for floors. Antistatic floor coatings are particularly useful in settings such as factories, "clean" rooms, laboratories, hospital operating rooms, etc. Specifications defining resistance characteristics of antistatic floor coatings have been established over the years. For cured antistatic floor coatings earlier specifications often called for an electrical resistance as low as 25,000–100,000 ohms to an upper value of 1,000,000 ohms. More recently floor specifications have called for resistances from a million to a billion ohms. In this application non-conductive (insulating) surfaces of will be regarded, for simplicity, to be those having electrical surface resistance that is substantially above a billion ohms. The test method used to measure electrical surface resistance here is known as NFPA-99. Another method that may be used is the ASTM Test Method F150-89.

Durable opaque antistatic floor coatings present special challenges. These coatings are typically fairly thick, often 10 mils or more, thus demanding a comparatively large amount of coating per unit area. The coating must contain sufficient antistatic pigment to establish the necessary electrical pathways in the coating and the coating must be opaque. At the same time a glossy floor finish is quite frequently required. As the quantity of pigment and opacifier in a coating increases, the gloss of the cured coat decreases. Accordingly the demand for glossy finishes has tended to limit the amount of pigmentary solids, including antistatic pigment and opacifiers which can be employed.

Antistatic floor coatings have been proposed which contain conductive materials other than tin oxide pigments. For example, conductive carbon-filled or graphite-filled coatings have been proposed which are substantially less expensive than tin oxide pigment coatings for antistatic service. The carbon-filled coatings produce finishes having quite dark tones which have been often deemed undesirable and objectionable for floors.

The cost of desirably light-colored tin oxide-rich conductive pigments generally is quite high in comparison to common coating ingredients. Accordingly, there has been as yet limited acceptance of antistatic coatings containing that sort of conductive pigment, particularly for use on floors, where considerable amounts of the pigment are required. A tin oxide-rich conductive pigment can be regarded as one that has at least about 5% by weight tin oxide, including any doping oxides.

Hard, impalpable achromatic filler minerals have been used in floor coatings for producing hard finishes. These minerals are not characterized as being conductive and have not been used as pigments in the oxide-rich antistatic floor coatings. Accordingly hard, impalpable achromatic filler minerals have not been considered as pigmentary materials in antistatic floor coatings.

It has been discovered that an improved antistatic pigment is provided by blending tin oxide-rich pigment with a hard, impalpable achromatic filler mineral. When this is done the conductivity of the coating is increased substantially over what it would have been had the hard, impalpable achromatic filler mineral not been added. This enables use of reduced quantities of tin oxide pigment. Moreover, the degree of glossiness of the coating is increased over what it would have been had its conductivity level been created by unblended tin-oxide pigment. Advantages of using the instant invention over prior proposals thus include the opportunity for increased facility in formulating and for substantial cost saving while achieving like or better antistatic coating performance (lower surface resistance) with opaque coatings containing tin oxide-rich pigments, and that in a wide range of colors. Surprisingly, this is accomplished by the addition of filler that is a relatively poor conductor of electricity.

The invention also offers the ability to lay down a guide coat that will not increase and can even lower the electrical resistance of an antistatic topcoat that contains a comparatively expensive tin oxide-rich pigment while at the same time to guard against the leaving of inadvertent overly-thin patches or even skimping by the applier.

DISCLOSURE OF THE INVENTION

One aspect of this invention is an antistatic coating composition comprising a pigment portion dispersed in a fluent portion, the fluent portion containing a curable film-forming binder, the pigment portion containing tin oxide-rich electrically-conductive pigment, the proportion of said binder relative to the solids of said pigment portion being sufficiently high to provide a binder-continuous film when said composition is deposited and cured as a film on a substrate, the composition being characterized by an electrical conductivity-enhancing proportion of hard, impalpable achromatic filler mineral blended with said tin oxide-rich pigment.

Another aspect of the invention is an improvement in process for coating a surface of a substrate with a curable, film-forming, binder-continuous antistatic coating having an electrically-conductive tin oxide-rich pigment as a fraction of its pigment blend, the blend rendering the antistatic coating substantially opaque in thin section when cured. The improvement comprises applying to said surface at least one curable undercoat, the uppermost of which exhibits an objectionable coloration and has electrical resistance when alone and cured that is at least as low as that of said antistatic coating when alone and cured, applying said antistatic coating over said uppermost undercoat; and curing said uppermost undercoated and said antistatic coating in place. The electrical resistance of an antistatic coating film on an insulating substrate is considered here to be equivalent to that of such coating film alone, i.e. in dry air.

Still another aspect of the invention is a substrate having a surface coated with a cured, binder-continuous film of antistatic coating having an electrically-conductive, tin oxide-rich pigment as a fraction of its pigment blend, the blend rendering the cured coating substantially opaque in thin section. The coated surface is characterized by having at least one cured undercoat beneath said antistatic coating, the uppermost of said undercoats exhibiting objectable coloration and electrical resistance alone that is at least as low as that of said antistatic coating alone.

BRIEF DESCRIPTION OF THE DRAWINGS

The drawing figure is a fragmentary vertical cross section of a clean electrically non-conductive polymeric industrial floor substrate rendered antistatic by the process of this invention.

DEFINITIONS

In this specification the following terms have the following meanings:

"Electrical resistance" or simply "resistance" (in an electrical context) means electrical surface resistance measured in ohms by the National Fire Protection Association (NFPA) Test Method 99, 1987 Edition, page 90, section 12-41.3.8, *Reduction in Electrostatic Hazard*; in some cases the *ASTM Standard Test method for Electrical Resistance of Conductive Resilient Flooring*, ASTM Designation F150-89, from the 1989 Annual book of ASTM Standards, Vol. 09.01, can be used as it is reasonably close to the NFPA method;

"Hard, impalpable, achromatic filler mineral" means a mineral particle of relatively poor electrical conductivity that is used to fill paints, and more specifically one that has Mho hardness of at least about 7, particle size too small to be felt by one's touch (i.e. <325 mesh U.S. Std. Sieve Series, and generally from submicron size to about 44 microns in effective diameter) and having Index of Refraction at 20° C. that is close enough to that of the fluent portion of the coating composition with which they are test-mixed to substantially disappear from the view of the naked eye and to lend no appreciable opacification or unwanted coloration to the resulting suspension (achromatic); typically these are fairly cheap as compared to tin oxide-containing pigments; they include corundum, tabular alumina, silica including quartz, garnet, spinel, and they have a powder specific resistivity well in excess of 1,000 ohm-centimeters.

"Tin oxide" means $SnO_2$ or the equivalent $SnO_2$ part of a doped or otherwise modified tin oxide-rich conductive pigment;

"Curable" means hardenable to an ostensible solid with a tack-free surface at room temperature, the hardening, i.e. "curing", being accomplished by the mixing in of a curing agent, the use of a catalyst or heat or electron beam or other radiant energy, by evaporation or a combination of two or more of these techniques to yield a hardened, i.e. "cured" deposit or film, frequently referred to as a "dry film."

"Electrically-conductive pigment" means a pigment having low enough resistance to allow the passage of electric current through or over it, i.e. having maximum powder specific resistivity in ohm-centimeters of 125 when under 2 metric tons of compression;

"Volatile" with respect to a solvent means one that has boiling point at atmosphere pressure not substantially above 190° C., and further that films of it will evaporate virtually completely in dry 25° C. (room temperature) air;

"Light-colored" means white, off-white, light tan, light gray, light yellow and, generally, weak tones of a fairly neutral nature;

"Opaque in thin section" means the ability to hide the color of a substrate with a 3 mil-thick cured film over it.

BEST MODES FOR CARRYING OUT THE INVENTION

Referring to the drawing figure, layer 16 is a glossy cured floor surface, a binder-continuous film that contains the following in the uncured state:

| PIGMENT PORTION | | |
|---|---|---|
| Ingredient | Kind | Wt. Parts in Formula |
| Filler | tabular alumina (10μ average particle size) | 50 |
| Opacifier | pigmentary rutile $TiO_2$ (0.2-0.4μ particle size) | 50 |
| Conductive Pigment | EM 140537L[1] (EM Industries, Inc. Hawthorne, N.Y. | 100.6 |

[1]particle size by laser diffraction 1-15μ, a complex of mica, $TiO_2$, $SiO_2$ and tin oxide doped with antimony, having the equivalent ratio in weight percent of 41% mica, 12% $TiO_2$, $SiO_2$, and 43% of tin and antimony oxides wherein the weight ratio of Sn/Sb is 85/15; other characteristics include:
light grey color;
3.2 gm/cc density;
specific surface (by BET) of 30.1 $M^2$/gm;
water insoluble;
less than 50 ohm-cm. specific resistivity.

| FLUENT PORTION | | |
|---|---|---|
| Ingredient | Kind | Wt. Parts in Formula |
| Epoxy resin | Epon 1001-X-75[2] | 133 |
| Curing agent therefor | Ancamide 220-EP-70[3] | 77 |
| Additional volatile solvents | | 104 |
| Miscellaneous agents[4] | | 8 |

[2]A solution of a glycidyl ether of 4, 4'-isopropylidene-diphenol, the product of Shell Chemical Co., Epon being their trademark.
[3]A solution of a polyamide having amine value of 245 mg KOH/gram, the product of Pacific Anchor Corporation, Ancamide being their trademark.
[4]Tris (dimethylaminomethyl)phenol cure accelerator;
Modaflow leveling agent, a trademark of Monsanto Company for an ethylacrylate and 2-ethylhexylacrylate copolymer;
Byk 052 deaerating agent, a trademark of Byk Chemie, having flash point, Seta method, of 34° C.;
Bentone SD-2 antisedimentation agent, the trademark of NL Industries, Inc.

12. The coat is allowed to cure at room temperature for 8 hours to provide a 4 mil-thick dry film layer. Then layer 16 is applied over it in one pass and cured at room temperature give an off-white coating about 4 mils thick. It completely obliterates the dark color of the carbon-charged undercoating.

The electrical resistance of the topcoat without the Primer 900 on the substrate is $1.7 \times 10^6$ ohms; with the Primer 900, the resistance is $8 \times 10^5$ ohms.

In the foregoing operation the undercoating was cured separately from the topcoat. The necessity in most cases for the desired substantially complete solvent evaporation renders wet-on-wet coating processes generally impractical where at least part of the cure is by solvent evaporation. An operation where the cure of the undercoat surface is incomplete can be of particular value when the resinous topcoat and undercoat both are polymerizable unsaturated polyester-styrene syrups, the topcoat being air-uninhibited and the undercoat or undercoats being air-inhibited, thus unable to reach their full hardness and solvent-resistance at their surfaces when they are exposed to air during their cure, usually with peroxide catalysis. The curing of the topcoat over the air-inhibited uppermost undercoat in such instance results in chemical bonding between such topcoat and said uppermost undercoat, (as occurs also between all of the previous undercoats as the next one is partially cured over and protects the one below).

In a related operation, using a polyurethane top coat and a 3 mil-thick dry film of Chemi-cote ESD 900 Primer thereunder, the 3-mil dry film glossy topcoat contains the following:

| Ingredient | Kind | Wt. Parts in Formula |
|---|---|---|
| PIGMENT PORTION | | |
| Filler | Tabular Alumina (10μ average particle size) | 50 |
| Opacifier | Pigmentary Rutile TiO$_2$ (0.2–0.4μ in particle size) | 50 |
| Conductive Pigment | EM 140537L | 167 |
| FLUENT PORTION | | |
| Polyols for polyurethane-forming resin | Desmondur N-75[5] | 313 |
| | Desmophen 650-65[5] | 354 |
| | Multron 221-75[6] | 34 |
| Additional volatile solvent | | 104 |
| Miscellaneous agents[7] | | 8 |

[5] A solution of 1, 6-hexamethylene diisocyanate-based polyisocyanate, the product of Mobay Co., Desmondur being their trademark;
[6] Solutions of saturated polyester resins, one having Hydroxyl No. of 155–190, the other 90–125, the products of Mobay Co., Desmophen and Multron being their trademarks;
[7] CAB 381-0.1, a cellulose acetate-butyrate levelling agent, the product of Eastman Chemical Co.; Byk-080, a nonaqueous polysilane copolymer deaerating agent, the product of Byk Chemie; Bentone SD-2 antisedimentation agent; Dibutyl tin dilaurate catalyst; and Baylith, a Zeolite A molecular sieve moisture scavenger dispersed in castor oil, the product of Mobay Co.

The electrical resistance of such topcoat alone on the substrate is in excess of two million ohms. Applied as it is over the undercoat (Primer 900), its resistance is 600,000 ohms. The primer in this instance exhibits 150,000–300,000 ohms.

The following test is set forth to dramatize the conductivity enhancement that can be made with the hard filler mineral, in this case the preferred tabular alumina.

A curable, film-forming epoxy resin coating has a pigment (solids) to binder (solids) weight ratio of 0.97:1 the pigment being a mixture of rutile TiO$_2$ and the conductive pigment EM 140537L, the conductive pigment being 59.8% of the total pigment by weight. Electrical resistance of a cured film of this material on a nonconductive substrate is 6 million ohms. When sufficient of the tabular alumina is added to give a pigment/binder weight ratio about 1.28:1, in which case the conductive pigment fraction of the total pigment declines to 53.6%, the resulting cured finish is less glossy, but still binder-continuous and its electrical resistance drops to 800,000 ohms. The alumina is considered a pigment for calculating the pigment/binder ratio.

Generally the weight ratio of the hard filler to the conductive pigment will be about 0.1:1 to 3:1, preferably about 0.15:1 to 2:1, the higher ratios being possible with the more highly conductive of the available tin oxide pigments. Even more highly preferred such filler is tabular alumina, and the preferred such ratio is about 0.25:1 to 1:1 total coating solids in the dry film as little as about 8–10% by weight can be the tin oxide-rich conductive pigment and as much as about 40–50%; generally it will between about 15 and 30%.

The use of the conductive uppermost undercoat in accordance with this invention does not impair (raise) the resistance of the tin oxide-rich topcoat over an electrically-nonconductive substrate, and it can enhance (lower) it if such undercoat is substantially more conductive than such topcoat.

Other organic and inorganic pigmentary solids can be used in the instant antistatic coatings for particular coloration, if desired. These include phthalocyanine blues and greens, zirconica, iron oxide yellows and reds, etc.

Other useful coating vehicles include vinyl and acrylic resins, synthetic rubbers and elastomers such as butyl rubber, polyamides, and polyolefin-containing polymers formulated for surface coatings. The epoxy resin and polyurethane-providing systems can be applied directly over concrete; they frequently are used on industrial floors.

Surface preparation for adherence of the antistatic coating is conventional. Thus, cleaning should be thorough. Washing, shot-blasting, scraping, acid-etching, buffing and scarifying often are used. A dry film build of 10–12 mils is frequent for floors. Areas should be ventilated, and overly-humid or cold air that can retard solvent evaporation should be avoided. Application on floors can be made efficiently with a squeegee and/or a roller or spray. Metal grounding contacts can be used if desired but are not required ordinarily to assist in speeding static charge decay in the cured inventive coating.

Although the invention has been described in its preferred form with a certain degree of peculiarity, it is understood that the present disclosure of preferred forms has been made only by way of example and that numerous changes in the details of formulation and its application to a substrate may be resorted to without departing from the spirit and scope of the invention hereinafter claimed.

I claim:

1. An antistatic coating composition consisting essentially of a pigment portion dispersed in a binder portion, the binder portion containing a curable film-forming binder, the pigment portion containing tin oxide-rich electrically-conductive pigment blended with an electrical conductivity-enhancing proportion of hard impalpable, achromatic filler mineral, the proportion of said binder relative to the solids of said pigment portion being sufficiently high to provide a binder-continuous film when said composition is deposited and cured as a film on a substrate.

2. The composition of claim 1 wherein said hard filler is tabular alumina.

3. The composition of claim 2 wherein the weight ratio of the tabular alumina to the conductive filler is about 0.25:1 to 1:1.

4. The composition of claim 1 which contains a volatile solvent for the binder.

5. The composition of claim 1 wherein the cured film resistance is between about $2.5 \times 10^4$ and $1 \times 10^9$ ohms.

6. A substrate having a surface coated with a cured film of the antistatic coating composition of claim 1.

7. The substrate of claim 6 which is a floor.

8. An antistatic coating composition consisting essentially of a binder portion in which a pigment portion is dispersed,
  the binder portion including a curable film-forming binder in sufficient amount for providing a binder-continuous film when the composition is deposited and cured on a substrate,
  the pigment portion comprising a mixture of antimony oxide-doped, tin oxide-rich electrically-conductive pigment and an electrical conductivity-aiding proportion of tabular alumina,
  there being a sufficient amount of said mixture in the composition for imparting to a resulting applied and cured film of said composition a resistance between about $2.5 \times 10^4$ and $10^9$ ohms.

9. The composition of claim 8 which contains a volatile solvent for the binder and pigmentary titanium dioxide.

10. The composition of claim 8 wherein the weight ratio of the tabular alumina to the conductive pigment is about 0.1:1 to 3:1.

11. A substrate having a surface coated with a cured film of the antistatic coating composition of claim 8.

12. In a process for coating a surface of a substrate with a curable film-forming, binder-continuous antistatic coating having an electrically-conductive tin oxide-rich pigment as a fraction of its pigment blend, said blend rendering the antistatic coating when cured substantially opaque, the improvement which comprises:
  applying to said surface at least one curable undercoat, the uppermost undercoat exhibits an undesired coloration and electrical resistance when cured that is at least as low as that of said antistatic coating;
  applying said antistatic coating as a topcoat over said uppermost undercoat; and
  curing said uppermost undercoat and said topcoat in place.

13. The process of claim 12 wherein the uppermost undercoat has electrical resistance that is lower than that of the substrate.

14. The process of claim 12 wherein the uppermost undercoat and said antistatic coating are cured separately from each other.

15. The process of claim 12 wherein there is only one undercoat.

16. The process of claim 12 wherein the electrical conductivity of the topcoat is enhanced with a hard, impalpable, achromatic filler mineral that is blended with said tin oxide-rich pigment, and the topcoat contains a volatile solvent.

17. The process of claim 16 wherein said hard filler is tabular alumina.

18. The process of claim 17 wherein the weight ratio of the tabular alumina to the conductive filler is about 0.15:1 to 1:1.

19. The process according to claim 16 wherein the binder providing in said binder continuous coating material for the topcoat and a curing agent are mixed for application of the topcoat to the undercoat and the weight ratio of the hard filler to the conductive pigment is about 0.1:1 to 3:1.

20. The process of claim 12 wherein, the uppermost undercoat is rendered electrically-conductive by virtue of its content of impalpable electrically-conductive carbon black.

21. The process of claim 12 wherein the uncured topcoat and the uncured undercoats are unsaturated polyester resin syrups in vinyl monomer solvent.

22. The process of claim 12 wherein the substrate is a floor.

23. A substrate having a surface coated with a cured, binder-continuous film of antistatic coating as a topcoat that has an electrically conductive, tin oxide-rich pigment as a fraction of its pigment blend, said blend rendering the cured coating substantially opaque the coated surface being characterized by having at least one cured undercoat beneath said antistatic topcoat coating, the uppermost of said undercoats exhibiting undesired coloration and electrical resistance that is at least as low as that of said antistatic topcoat coating.

24. The coated substrate of claim 23 wherein the uppermost undercoat has electrical resistance that is lower than that of the substrate.

25. The coated substrate of claim 23 wherein the electrical conductivity of the topcoat is enhanced with of hard, impalpable, achromatic filler mineral that is blended with said tin oxide-rich pigment.

26. The coated substrate of claim 25 wherein said hard filler is tabular alumina.

27. The coated substrate of claim 26 wherein the weight ratio of the tabular alumina to the conductive tin oxide pigment is about 0.15:1 to 1:1.

28. The coated substrate of claim 25 wherein the topcoat contains an epoxy resin.

29. The coated substrate of claim 25 wherein the topcoat contains a polyurethane polymer.

30. The coated substrate of claim 25 wherein the weight ratio of the hard filler to the conductive pigment is about 0.1:1 to 3:1.

31. The coated substrate of claim 23 wherein, the uppermost undercoat is rendered electrically-conductive by virtue of its content of impalpable electrically-conductive carbon black.

32. The coated substrate of claim 23 wherein the topcoat and the undercoat immediately thereunder comprise unsaturated polyester resin cured with a vinyl monomer.

33. The substrate of claim 23 which is a floor.

34. In a process for coating a surface of a substrate with a curable film-forming, binder-continuous antistatic coating having an electrically-conductive tin oxide-rich pigment as a fraction of its pigment blend, the improvement comprising:
  applying to said surface at least one curable undercoat that has electrical resistance when cured that is at least as low as that of said antistatic coating when cured;
  applying said antistatic coating as a topcoat over said uppermost undercoat; and curing said uppermost undercoat and said topcoat in place.

35. The process of claim 34, wherein the electrical conductivity of the topcoat is enhanced with particles of hard, impalpable, achromatic filler mineral that are blended with said tin oxide-rich pigment.

36. An antistatic floor coating composition consisting essentially of a tin oxide-rich electrically conductive pigment and electrical conductivity enhancing particles of hard, impalpable, achromatic filler selected from the group consisting of tabular alumina, corundum, quartz, garnet, spinel or mixture thereof, said pigment and filler particles being dispersed in a curable film-forming binder.

* * * * *